Oct. 20, 1931.  H. K. KOUYOUMJIAN  1,828,054
ELECTRIC CONTROLLING APPARATUS
Filed May 17, 1929  2 Sheets-Sheet 1

INVENTOR
Haroutiun K. Kouyoumjian
BY
Lawrence K. Sager
ATTORNEY

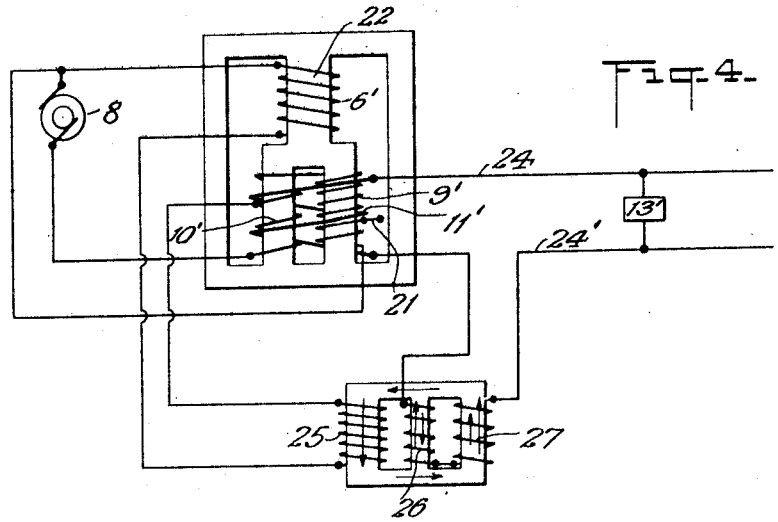
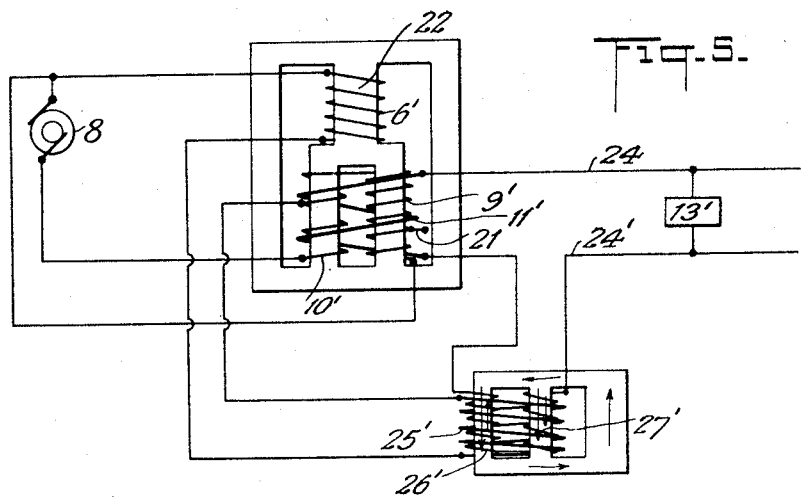
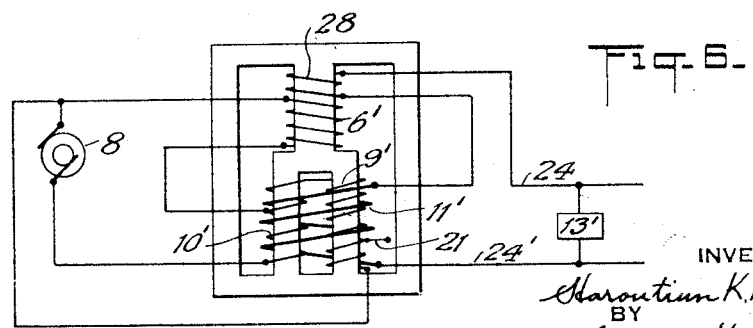

Patented Oct. 20, 1931

1,828,054

UNITED STATES PATENT OFFICE

HAROUTIUN K. KOUYOUMJIAN, OF PROVIDENCE, RHODE ISLAND, ASSIGNOR TO WARD LEONARD ELECTRIC COMPANY, A CORPORATION OF NEW YORK

ELECTRIC CONTROLLING APPARATUS

Application filed May 17, 1929. Serial No. 363,887.

This invention relates to an improved method and apparatus whereby the voltage delivered to a consumption circuit may be automatically controlled to maintain the same substantially constant, regardless of variations in the alternating current supply voltage and of change in load of the consumption circuit. Although particularly well adapted for securing such results, the improvement is also adapted for securing, if desired, an increase in voltage supplied to the consumption circuit upon increase of load, or a decrease in load; and for other controlling effects, according to the particular requirements.

In my pending applications, Serial Numbers 306,259 and 344,333, I have disclosed inventions wherein the voltage delivered to the consumption circuit may be maintained constant, or otherwise controlled, regardless of variations in the voltage of the alternating current supply circuit.

There are many instances where it is desirable to transform the alternating current supply energy to direct current energy for utilization in the consumption circuit. The present invention is adapted for maintaining the voltage supplied to such a direct current circuit substantially constant, regardless of change of load in the direct current consumption circuit and regardless of variations in the alternating current supply voltage. It is also adapted in another form thereof, to maintain the voltage supplied to an alternating current consumption circuit substantially constant, regardless of load changes and of supply voltage changes.

The main object of the present invention is to control the voltage supplied to the consumption circuit regardless of change of load and change of the supply voltage and accomplish this by a simple form of apparatus which will be efficient and effective in accomplishing the required results and dependable with long continued use. Another object is to avoid the use of moving parts and of any elements requiring frequent inspection, adjustment or repairs. Another object is to produce a form of apparatus which may be economically manufactured and which does not require the use of special parts which are costly to manufacture, or involve the use of costly material. These and other advantages and objects of this invention will be understood from the following description and drawings.

Figure 1:
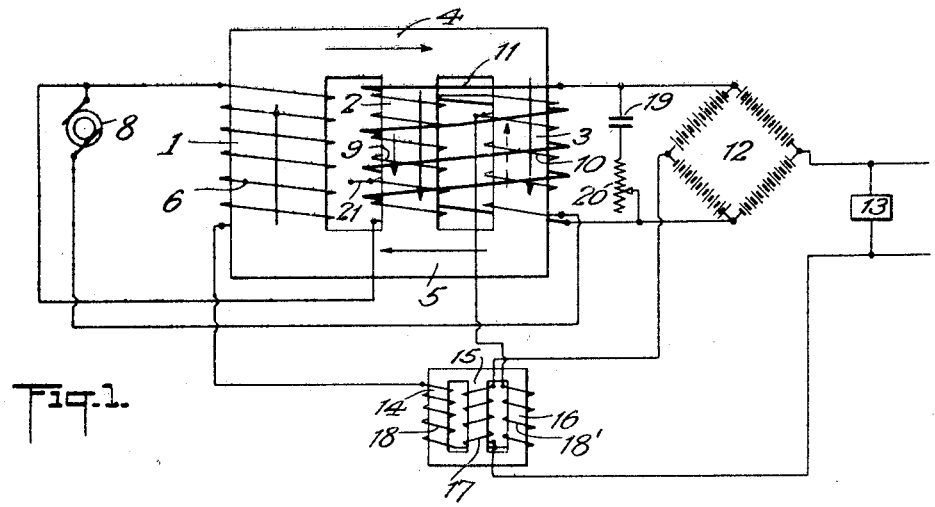
Figure 2:
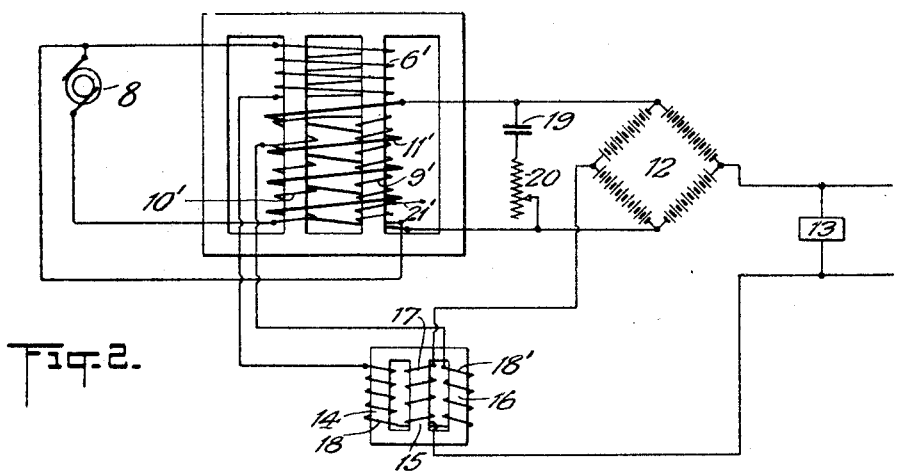
Figure 3:
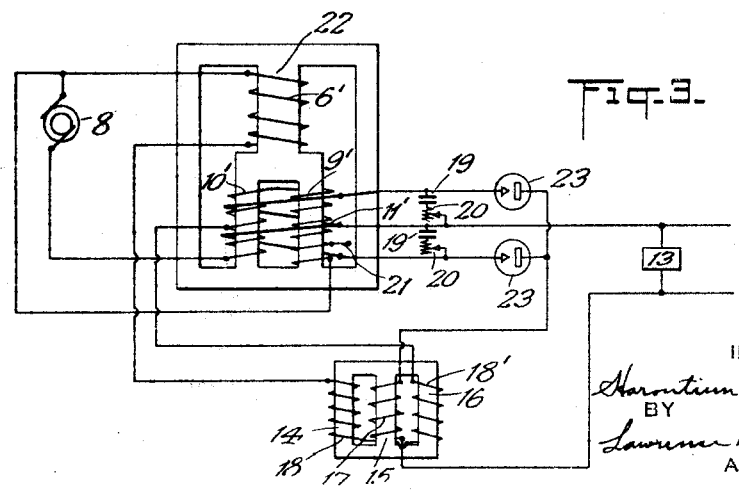

Fig. 1 is a diagram illustrating one embodiment of my invention for the control of a direct current consumption circuit; Fig. 2 is a similar diagram with a modified form of controlling apparatus; Fig. 3 is a similar diagram of another modification; Fig. 4 is a diagram of an embodiment of my invention for the control of an alternating current consumption circuit; Fig. 5 is a diagram of a modified form of controlling device; and Fig. 6 is a diagram of another modification.

Referring to Fig. 1, the main voltage controller is shown as having three legs and is laminated in the usual manner, having its laminae in parallel planes. The three parallel legs 1, 2 and 3 are connected together by an upper cross-piece 4 and a lower cross-piece 5. The leg 1, in this instance, is the main leg and adapted to carry the main flux of the regulator. The cross-section of the legs 2 and 3 are ordinarily about the same and the cross-section of each is about half of that of the leg 1.

The leg 1 is enveloped by an alternating current winding 6 which derives its energy from the alternating current source 8. The leg 2 carries an alternating current winding 9 connected in series with another winding 10 around the leg 3 and the two coils are connected across the source of supply 8. In some instances, the windings 9 and 10 may be connected in parallel with each other to the source. The direction of the windings 9 and 10 with reference to each other is such as to act cumulatively with reference to the excitation of the legs 2 and 3; consequently, the direction of the magnetic flux due to the winding 9 will be additive to the flux due to the winding 1, whereas the flux due to the winding 10 will tend to oppose that due to the winding 1. Considering one instant of operation, the direction of the main flux due to winding 6 is indicated by the long full line arrows, the direction of the flux due to winding 9 is indicated by the short full line arrow and the direction of the flux tending to be set up by the winding 10 is indicated by the short dotted line arrow.

The output, or secondary, winding 11 is shown enveloping both of the legs 2 and 3 and supplies a circuit leading to a rectifier 12 for changing the current to direct current. In the metal oxide type of rectifier indicated as one example, the direct current consumption circuit is derived from opposite mid-points of the rectifier and supplies the direct current variable load consumption devices such as indicated at 13.

Another inductive controller is shown as having three parallel legs 14, 15 and 16 connected together at the end by cross-pieces and is laminated in the usual manner in parallel planes. The middle leg 15 is provided with a direct current winding 17, which is in series with one line of the direct current consumption circuit, being shown in series between one of the output terminals of the rectifier and the direct current consumption devices. The two outer legs are provided with alternating current windings 18 and 18′ shown connected in series with each other and are wound to have a cumulative effect magnetically with reference to each other. These alternating current windings are connected in series with the primary winding 6 of the main transformer and controller, the circuit from one side of the alternating current source 8 passing through the primary winding 6, then through the windings 18 and 18′ and then through a portion of the bucking winding 10 to the other side of the source 8. In some cases, the primary winding 6 and the windings 18 and 18′ may be connected in series directly across the source 8 without including the bucking winding 10, or any portion thereof; but the inclusion of the bucking winding in this circuit has the advantage that, upon increase in the supply voltage above normal, the tendency is to reduce the wattless current in the main winding, with resulting advantages. In some cases, the windings 18 and 18′ may be connected in parallel with each other, instead of in series as shown in Fig. 1.

As practically all forms of rectifiers are sensitive to change in wave form, it is desirable to introduce a wave form correcting capacitor 19 across the input circuit of the rectifier. This permits a more economical operation of the voltage regulator; and as a means for varying the wave form correcting capacitor, an adjustable resistor 20 is placed in series with the capacitor across the line. This may be used to improve the effectiveness of the capacitor and also the regulation at various loads.

It will be understood that the number of turns of the various windings indicated in Fig. 1 are as shown for the purpose of simplicity and clearness, and that in actual practise, the number of turns and size of wire will be such as to give the particular results desired, and also be adapted to the particular conditions met in different situations. In obtaining the particular results desired, it will often be desirable to provide the windings with a number of tap connections so that the number of effective turns thereof may be varied as desired. For example, if the alternating current source 8 is delivering a current having a frequency of 60 cycles, the full number of turns of the cumulative winding 9 may be required, but if the controlling apparatus be supplied from a source having a frequency of 25 cycles, a lesser number of turns of the cumulative winding 9 should be included in the circuit. Thus a tap 21 is indicated as extending from the winding 9 so that the connection to one terminal of the source may be made at the tap for 25 cycle operation, instead of at the outer terminal of the winding 9; but the effect of commercial variations from the normal frequency are automatically compensated for by the controlling action of the regulator. Also, the connection of the winding 18′ to the winding 10 may be made to include more or less of the bucking winding in circuit across the source to suit the particular conditions, or to attain desired results. Also, instead of using the form of rectifier indicated, any other form may be used.

The number of ampere turns of windings 9 and 10 and the cross-section of the legs 2 and 3 are so related that under normal conditions, these cores are worked near, or just below, the knee of the saturation curve, although in some cases, for particular requirements, these cores may be worked at a different part of the saturation curve. In general, the leg having the bucking winding will be worked along the straight portion of the saturation curve below the knee and at a lower magnetic density than that of the leg having the cumulative winding.

Considering first the effect of abnormal changes in the supply voltage and the action whereby the voltage of the consumption circuit is maintained substantially constant, regardless of change in the supply voltage, it may be assumed that the supply voltage drops to an abnormally low amount. The reduced voltage would, of course, cause a reduced excitation in the leg 2, due to the lesser current passing through the cumulatively acting winding 9, but the flux in the leg 3 would be correspondingly increased, because the bucking winding 10 would receive a decreased current and have less opposing effect, the legs then being worked on the straight portion of the saturation curve, or somewhat below the knee of the curve. Thus the action of the two windings 9 and 10 in combination with the excitation due to the main winding 6 causes the resultant flux, to which the secondary 11 is subjected, to remain substantially the same.

Now suppose the supply voltage to be abnormally high; this, of course, tends to increase the total main flux due to the increased excitation, or increase of ampere turns, in the windings 6 and 9, but the increase due to the added effect of winding 9 is not proportional, because the increased flux in the leg 2 causes the excitation of the same to be such that it is carried along the bend or knee of the saturation or permeability curve. The excitation due to the winding 10, however, causes increased opposition to the main flux, and as the leg 3 is then worked along the straight portion of the permeability curve, its opposition is more effective on the main flux than is the attempted added effect due to the winding 9. Thus the resultant effect on the main flux is to prevent any objectionable increase and to prevent any substantial change in the resultant flux to which the secondary winding 11 is subjected, or any substantial change in the voltage delivered to the rectifier and to the direct current consumption circuit. In other words, regardless of variations in the voltage of the alternating current supply, the direct current output voltage is maintained substantially constant.

Now, as regards the voltage of the output winding 11 and of the direct current consumption circuit, being affected by change of load, an increase in load will tend to decrease the voltage, owing to the fact that an increase of current in the secondary winding 11 is substantially additive to the effect of the bucking winding 10, tending to decrease the resultant flux and lower the output voltage. The auxiliary controlling device, however, will co-operate with the voltage controller, so that the combined effect is to maintain a substantially constant voltage on the consumption circuit, regardless of supply voltage variations and also variations in the load current. Thus when the load in the consumption circuit increases, the flux due to the direct current winding 17 increases, causing the inductance or impedance of the alternating current windings 18 and 18' to be decreased. This permits more current to flow through the primary exciting winding 6, with the result that the flux to which the secondary winding 11 is submitted, is correspondingly increased. Consequently, the voltage induced in the secondary winding 11 is maintained substantially constant, with increased load. Similarly, when the load on the consumption circuit decreases, a decreased current flows in the winding 17, permitting the inductance and impedance of the auxiliary controlling device as regards the alternating current windings 18 and 18', to be increased. This reduces the current in the main winding 6 and correspondingly reduces the resultant flux to which the secondary winding 11 is subjected. Thus the effect of a decreasing load in the direct current consumption circuit is offset by a decreasing effect of the winding 6 and the output voltage is held substantially constant.

Although the effect of supply voltage changes and changes in the load have been separately analyzed, it will be understood that these controlling effects may occur simultaneously, or successively, and in different orders of sequence, the compensation and regulation being always such as to compensate for the particular change or changes appearing and result in maintaining a substantially constant output under all conditions.

It will be understood that any desired control of the output voltage may be obtained by location and proportioning of the parts relatively to each other, the output voltage being caused to increase, if desired, with a decrease in the supply voltage, or to decrease with a decrease in the supply voltage, or the reverse, and likewise with increase of load, the voltage may be caused to increase or decrease and any desired results obtained to suit the particular requirements.

It will also be understood that the windings may, in some cases, be placed side by side, or sandwiched, instead of being superimposed, and that the secondary output winding may be located otherwise than as shown; and that in some cases the primary and secondary windings may both be superimposed over the cumulative and bucking windings, although in general, the closest regulation is obtainable with the windings located as indicated in the accompanying drawings.

In the form shown in Fig. 2, the form of the main controller is such that the laminated core is made up of four parallel legs, the cumulative winding 9' on a portion of one of the inner legs being in series with the bucking winding 10' on a corresponding portion of the other inner leg. The primary winding 6' envelopes the other portions of the two inner legs and is in series with the windings 18 and 18' of the reactor or impedance device, as well as with a portion of the bucking winding 10'. In the form shown in Fig. 3, the form of the core of the regulator and the location of the windings are similar to that of Fig. 2, except that the upper portion of the two inner legs are merged into a single leg 22. Also, in Fig. 3, the rectifier is shown in the form of vacuum, or gas filled, tubes 23, the cathodes being connected together to form one branch of the consumption circuit passing through the direct current winding 17 of the auxiliary controller, and the other branch of the consumption circuit being led from the midpoint of the secondary winding 11'. The capacitors 19 and adjustable resistors 20 are connected between mid-connection of the secondary winding 11′ and the outer leads therefrom.

The forms of the units comprising the controlling apparatus and relationship of their parts, as well as the type of rectifiers, may be varied from those indicated in the drawings to suit the particular preference of the designing engineer, the degree and character of regulation required and the particular conditions to be fulfilled.

In the above described embodiments, cases where the current in the consumption circuit is direct, instead of alternating, have been considered. There are also many situations where the consumption circuit is alternating and likewise subject to considerable variation in load, and it becomes desirable to compensate for load changes, as well as for variation in the alternating current supply circuit.

Fig. 4 shows my invention where the consumption circuit 24, 24′ is alternating and the variable load translating devices utilizing the alternating current are indicated at 13″. Here, no rectifier is used and the current from the secondary winding 11′ is supplied directly to the consumption circuit through the reactor of the controlling apparatus. The main controller is of the form shown in Fig. 3 and is correspondingly numbered. The auxiliary reactor for taking care of load variations in combination with the main controller is shown as having a laminated core with three parallel legs connected by cross-pieces at the ends. The left-hand leg is indicated as of larger cross-section than the other two and is enveloped by a winding 25, which is connected in series with the primary winding 6′ and part of the turns of the bucking winding 10′. The windings 26 and 27 are located respectively on the other two legs of the core and are shown connected in series with each other and in series in the line 24′ of the alternating current consumption circuit. The direction of the turns of the three windings are such that the windings 25 and 27 act cumulatively with reference to each other in the magnetization of the core, while the winding 26 opposes the magnetization due to the winding 25. Thus the windings 26 and 27 are cumulative with reference to each other, as indicated by the short arrows, in the magnetization of two legs of the core, whereas one of these windings opposes and one adds to the flux created by the winding 25, indicated by the long arrows.

The controlling action as regards variations in the voltage of the supply line is similar to that already described as regards the main regulator. As regards changes in load, it may first be assumed that the load be increased and, unless some compensation were provided, it would tend to decrease the voltage supplied to the consumption circuit. However, the increased flow of current through the windings 26 and 27 causes the flux due to the windings 26 and 27 to be increased. This lowers the impedance of the core as regards the winding 25 and thus permits more current to pass through this winding and through the primary winding 6′, and thus compensates for the effect of the increased load as regards the output voltage of the secondary winding 11′. Under maximum load conditions, the magnetization due to the windings 26 and 27 should be such as to bring the core to saturation, or near saturation.

When the load in the alternating current consumption circuit decreases, the decreased current through the windings 26 and 27 causes the reverse effect, which increases the impedance or choking effect of the core as regards the winding 25. Consequently, a decreased current will pass through the winding 25 and primary winding 6′ and thus prevent the voltage supplied to the consumption circuit from being increased under the decreased load. Thus under all conditions of operation, as regards variations in the supply voltage and changes in the load, the apparatus serves to maintain a substantially constant voltage on the output circuit. If desired, as already explained, the proportions and the relationship of the parts may be such as to give any desired control of the output voltage when the supply voltage changes, or the load on the consumption circuit is varied.

The form of the reactor and relationship of the windings thereof may be varied; and in Fig. 5 the winding 25′, corresponding to the winding 25 of Fig. 4, is shown as enveloping both the windings 26′ and 27′ which correspond to the windings 26 and 27 of Fig. 4.

In Fig. 6, the auxiliary reactor is omitted and a coil 28 in series with the load is applied directly to the transformer. This coil is shown wound on the leg, or portion of the core to which the primary winding 6′ is applied and wound in such direction as to assist the primary winding excitation. The regulation will not ordinarily be as good as obtained with the other forms herein disclosed, but may be suitable and desirable for certain purposes.

It will be apparent to those skilled in the art that this invention may be embodied in various forms of apparatus and that various modifications may be made to suit particular conditions and requirements without departing from the scope of the invention.

I claim:

1. The combination of a transformer having a core and a primary winding thereon, an output circuit supplied with energy derived from said transformer, windings on said core to compensate for changes in the supply voltage, and a second core having a winding in series in the output circuit and having a winding subjected to the influence of said series winding and affecting the ampere turns of the primary of said transformer.

2. The combination of a transformer, a rectifier for transforming the output from said transformer to direct current energy, said transformer having windings to compensate for variations in the supply voltage, and a controlling device having a winding subjected to the direct current of the consumption circuit and having a winding influenced thereby and affecting the exciting current in the primary of said transformer.

3. The combination of a transformer, a rectifier for transforming the output from said transformer to direct current energy, a wave form corrector in circuit between the secondary of said transformer and said rectifier, said transformer having windings to compensate for variations in the supply voltage, and a controlling device comprising a core having a winding in series in the direct current consumption circuit and having a winding influenced thereby and in series with the primary of said transformer.

4. The combination of a transformer having a core and a primary winding thereon, an output circuit supplied with energy derived from said transformer, an alternating current exciting winding on a portion of said core acting in opposition to said primary winding and embracing a portion of the core in the path of a portion of the main flux of the core, a second core, a winding on said second core in series in the output circuit, and a second winding on said second core in series with said primary winding.

5. The combination of a transformer having a core and a primary winding thereon, an output circuit supplied with energy derived from said transformer, an alternating current exciting winding on a portion of said core acting in opposition to said primary winding and embracing a portion of the core in the path of a portion of the main flux of the core, an additional alternating current exciting winding on another portion of said core acting cumulatively with said primary winding, a second core, a winding on said second core in series in the output circuit, and a second winding on said second core in series with said primary winding.

6. The combination of a transformer having a core and a primary winding thereon, an output circuit supplied with energy derived from said transformer, an alternating current exciting winding on a portion of said core acting in opposition to said primary winding and embracing a portion of the core in the path of a portion of the main flux of the core, said primary winding being connected in series with at least a portion of said second-named winding, a second core, a winding on said second core in series in the output circuit, and a second winding on said second core in series with said primary winding.

7. The combination of a transformer having a core and a primary winding thereon, an output circuit supplied with energy derived from said transformer, an alternating current exciting winding on a portion of said core acting in opposition to said primary winding and embracing a portion of the core in the path of a portion of the main flux of the core, said primary winding being connected in series with at least a portion of said second-named winding, an additional alternating current exciting winding on another portion of said core acting cumulatively with said primary winding, a second core, a winding on said second core in series in the output circuit, and a second winding on said second core in series with said primary winding.

HAROUTIUN K. KOUYOUMJIAN.